US008829916B2

(12) United States Patent
Defoort et al.

(10) Patent No.: US 8,829,916 B2
(45) Date of Patent: Sep. 9, 2014

(54) METHODS FOR DETERMINING THE LOCATION OF A DEFECT IN A WIRED TRANSMISSION LINE AND SYSTEMS ACCORDING TO SUCH METHODS

(75) Inventors: Frank Cyriel Michel Defoort, Kruibeke-Bazel (BE); Danny Van Bruyssel, Bonheiden (BE)

(73) Assignee: Alcatel Lucent, Boulogne Billancourt (FR)

( * ) Notice: Subject to any disclaimer, the term of this patent is extended or adjusted under 35 U.S.C. 154(b) by 410 days.

(21) Appl. No.: 13/144,019

(22) PCT Filed: Jan. 27, 2010

(86) PCT No.: PCT/EP2010/000499
§ 371 (c)(1),
(2), (4) Date: Aug. 9, 2011

(87) PCT Pub. No.: WO2010/086159
PCT Pub. Date: Aug. 5, 2010

(65) Prior Publication Data
US 2011/0285400 A1     Nov. 24, 2011

(30) Foreign Application Priority Data

Jan. 30, 2009   (EP) .................................... 09305082

(51) Int. Cl.
*G01R 31/08* (2006.01)
*H04M 3/08* (2006.01)
*H04M 3/30* (2006.01)

(52) U.S. Cl.
CPC ............... *H04M 3/085* (2013.01); *H04M 3/30* (2013.01)
USPC .......................................... 324/512; 324/527

(58) Field of Classification Search
USPC .......................... 324/512, 520, 522, 529, 527
See application file for complete search history.

(56) References Cited

U.S. PATENT DOCUMENTS

| 3,609,535 | A | * | 9/1971 | Paine et al. | 324/513 |
| 5,530,364 | A | * | 6/1996 | Mashikian et al. | 324/529 |
| 6,636,048 | B2 | * | 10/2003 | Sciacero et al. | 324/520 |
| 2002/0121903 | A1 | * | 9/2002 | Hu et al. | 324/522 |
| 2004/0189317 | A1 | * | 9/2004 | Borchert et al. | 324/512 |

FOREIGN PATENT DOCUMENTS

WO     WO-02089454 A2     11/2002

OTHER PUBLICATIONS

Trigger, J., et al.: "New Technology for Reducing Operational Costs" BT Technology Journal, Springer, Dordrecht, NL, vol. 16, No. 4, (pp. 152-164), Oct. 1, 1998.
International Search Report, Mar. 9, 2010.

* cited by examiner

*Primary Examiner* — Vincent Q Nguyen
(74) *Attorney, Agent, or Firm* — Harness, Dickey & Pierce

(57) ABSTRACT

In one embodiment, the method for locating a defect in a wired transmission line, which extends between a first end and a second end, includes measuring a first modified noise signal at the first end by a first measuring unit, and making a first representation of the first modified noise signal. A second modified noise signal is measured at the second end by a second measuring unit, and a second representation of the second modified noise signal is made. The location of the defects are derived from the representations.

15 Claims, 1 Drawing Sheet

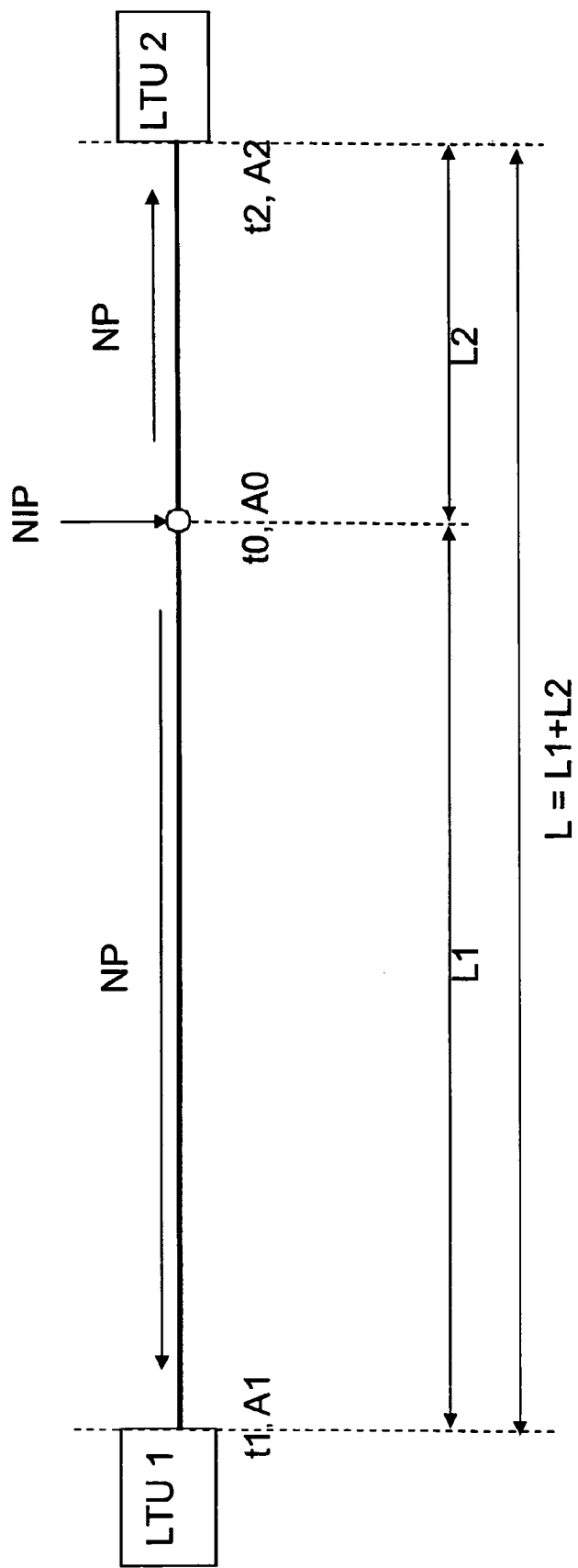

METHODS FOR DETERMINING THE LOCATION OF A DEFECT IN A WIRED TRANSMISSION LINE AND SYSTEMS ACCORDING TO SUCH METHODS

TECHNICAL FIELD OF THE INVENTION

The present invention relates to the field of telecommunication networks. It relates to methods and systems for locating a defect in a wired transmission line.

BACKGROUND OF THE INVENTION

In DSL technology, faults and issues in the physical wiring between the DSLAM (DSL Access Multiplexer) (which could be located in e.g. a Central office (CO) or in a street cabinet) and Customer premises equipment (CPE) cause today an unacceptable error rate for high demanding applications as video, audio streaming, and gaming (=triple play). A typical wiring issue can be a portion of unbalanced or untwisted pair, which causes susceptibility for radiation from external sources to be picked up, and disturbs the DSL signal. This external noise signal is typically received in common mode interference on the twisted pair, and translates into differential mode interference at locations where the line or cable is unbalanced or untwisted.

Such wiring issue often occurs at locations where twisted cable segments are connected to each other:
- at Main Distribution Frame (MDF) at the Central Office where the DSLAM is located;
- at MDF in the Remote Unit;
- at any connection point in the street between the CO and houses of end-users where the Customer Premises Equipment (CPE) is located;
- in the houses of end-users where wiring segments link the incoming twisted pair with the CPE.

Some existing systems allow sensing the fact that a line suffers from a higher than expected amount of disturbing noise caused by an external source, but these systems cannot determine the location of the noise injection and thus of the defect. This makes repairing the line very difficult, as a DSL loop can be several kilometers long which makes it inefficient to check any possible connection point of a line. Often the line is not physically accessible for a technician over at least a part of its length.

There is a need for methods and systems which are capable of efficiently locating the defects in transmission lines.

SUMMARY OF THE INVENTION

When terms as "first", "second", "third" and the like are used, this does not necessarily mean that a sequential or that a chronological order is to be assumed.

The term "comprising", should be interpreted as such that it does not exclude other elements or steps.

According to first aspect of the present invention a method is disclosed for locating a defect in a wired transmission line, the transmission line extending between a first end and a second end, and the defect allowing the ingress of a noise signal into the transmission line, comprising;
- measuring a first modified noise signal at the first end by a first measuring unit, and making a first representation of the first modified noise signal;
- measuring a second modified noise signal at the second end by a second measuring unit, and making a second representation of the second modified noise signal;
- deriving the location of the defects from the representations.

According to embodiments of the present invention the first and/or second modified noise signals, or the first and/or second representations respectively, can further be transmitted or forwarded to a central processing unit, which is adapted for receiving the first and/or second modified noise signals (or the first and/or second representation of those signals) and for deriving information therefrom.

The ingress of the noise signal can be seen as the capturing or reception of the noise signal by the defect.

A representation of a (modified) noise signal can for instance be obtained by sampling the noise signal in the time domain, optionally including also information on the time axis (for instance time stamps for every sample, or time stamp of the first sample and the used sampling frequency).

The representation can thus be the measured (modified) signal itself, but can also be a processed measurement signal. The representation can also be a timestamp of the arrival of the respective modified noise signal.

The act of measuring a first/second modified noise signal can preferably be performed by a first/second measurement unit. These measurement units can be comprised in a first and a second line testing unit (LTU 1, LTU 2) respectively. The central processing unit can be comprised in one of the line testing units, while the other line testing unit may be adapted for transmitting or transferring said measurements or a representation of said measurements to the other line testing unit.

The central processing unit can also be located outside of both the first and the second line testing units. In those cases both the first and the second line testing units are preferably adapted for forwarding or transmitting the measurement (or the presentation of the measurement) to a central processing unit.

The forwarding or transmitting or communicating of the measured signal (or the representation of the signal) can be performed over the transmission line extending between the first end and the second end. This is though not necessary; it could also happen by means of for instance wireless communication or other technologies known to the skilled person.

According to embodiments of the present invention the method further comprises synchronising the first and the second measuring unit located respectively at the first and the second end of said transmission line.

The first and second measurement units can be positioned at the first and second end of the transmission line, on permanent or temporarily basis as will be described later.

According to preferred embodiments synchronisation of the first and the second measuring unit comprises time transfer and frequency synchronisation between the first and second ends.

According to preferred embodiments deriving the location of said defects from the first and the second representations can comprise;
- determining the time difference between the arrival of the first modified noise signal and the second modified noise signal;
- based on at least a predetermined line length and predetermined transmission line characteristics, determine the location of the defects.

According to preferred embodiments, the time difference can be derived from the difference of the phase characteristics in function of frequency of the first or the second modified noise signal. The phase characteristic of a modified noise signal can be obtained from its Fourier transform. This Fourier transform gives per frequency a complex number, typically in Cartesian format e.g. $(x+j*y)$. When these complex numbers are transformed to Polar format e.g. (R,Φ)=(radius, angle), the angle will give the phase of the signal at the particular frequency $\Phi(\omega)$ (where $\omega=2\pi f$, with f the frequency). From this difference in phase characteristics $\Phi2(f)-\Phi1(f)$, two time differences can be calculated:

$$\text{The phase delay difference} = \left(\frac{\Phi2(\omega) - \Phi1(\omega)}{\omega}\right)$$

$$\text{The group delay difference} = \frac{d(\Phi2(\omega) - \Phi1(\omega))}{d\omega}$$

The first is a plain division, while the second is a first derivative. Typically these will give different numbers for both methods and for every frequency. Persons skilled in the art can design algorithms based on heuristics to extract the best estimate for the time difference.

According to preferred embodiments the Fourier transform can be calculated from the representation.

According to preferred embodiments the representation itself can be the Fourier transform itself.

According to preferred embodiments the method comprises
  determining a measure of the amplitude difference between the first and second representation of said first and said second modified noise signal at the first and second end;
  derive the location of the defect from the measure of the amplitude difference, based on at least predetermined line length and on a predetermined characteristics of said transmission line.

The predetermined characteristic of the transmission line can be for instance the propagation velocity, attenuation characteristics (for instance in dB per unit length), phase characteristics, or in general a model of the complex valued transfer function H(f). This Transfer Function H(f) is a complex function (a+jb) in function of frequency, describing the effect of the transmission line on a signal propagating over that line (typically describing effects on amplitude and phase of the signals).

The representation can comprise for instance the amplitude of the respective modified noise signal. The measure for the amplitude difference can comprise a value corresponding to the actual difference in amplitude or to the amplitude ratio and can optionally be in function of frequency.

According to preferred embodiments deriving the location of the defects from the representations can comprise determining the measure for the amplitude difference and/or determining the time difference from the division of the Fourier transform of the cross correlation function of the first and second modified noise signal by the Fourier transform of the autocorrelation function of the first or the second modified noise signal.

According to preferred embodiments of the first aspect the method is applied to a twisted pair transmission line. These twisted pair transmission lines are typically used in DSL applications.

According to embodiments of the present invention the noise signal can be such that it introduces a differential mode interference on the wires of the twisted pair line. The noise signals can be:
  Impulsive noise, generated by e.g. the off-on switching of electrical home appliances (e.g. refrigerator, air-conditioning, fluorescent lamps, dimmers . . . )
  RFI (Radio Frequency Interference) Noise, generated by radio transmitters (e.g. broadcast radio stations, amateur radio)
  Crosstalk Noise, generated by DSL transmission on other pairs in the same cable between the DSLAM and other CPEs The method can also be applied to a transmission line of the coaxial line type.

The method can also be applied to a transmission line of the optical line type.

According to embodiments of the present invention the ingress moment of the noise signal is not known or not predetermined. The ingress moment can be defined as the moment or time at which the defect in the transmission line receives or captures the external noise signal. It can be seen as the moment in time at which the noise signal starts being propagated by the transmission line.

According to embodiments of the present invention the transmission line is not in use when measuring the first and the second modified noise signals. According to other embodiments the transmission line may be in use when measuring the respective modified noise signals, although this is thus not necessary. When the transmission line is in use the method may comprise filtering out of the signal component which is due to the signals present in the line during such use. When the transmission line is in use the method may comprise methods to separate the signal component which is due to the signals present on the line according to such use, and the noise ingress signal.

One possibility for the line being in use is the simultaneous use for reflectometry (Single Ended Line Testing SELT). In this case, any of the transmitters at the first or the second end is effectively sending an excitation signal on the transmission line, which is not intended to be received at the other side.

Another possibility for the line being in use is where the measuring units are incorporated into modems/transceiver units (XTU-R/XTU-C). These modems could be in normal data transmission mode, while simultaneously the measuring units are executing the method according to embodiments of the present invention. In this case, the separation of the data signal and the modified noise signals can be in the constellation decoders determining the error signal in a decision-directed manner, as known to the skilled person.

According to embodiments of the present invention the noise signal does not comprise a predetermined excitation signal. In other words the characteristics of the noise signal are not known ab initio. It is an advantage of embodiments of the present invention that these characteristics of the noise signal do not have to be predetermined or known, in order to achieve the defect retrieval.

According to preferred embodiments the method further comprises determining or retrieving the line length between the first end and the second end. This may be determined by methods which are known to the skilled person, or may be retrieved from a database which may be provided for such purposes.

According to a second aspect of the present invention a system is disclosed for determining the location of a defect in a wired transmission line, comprising
  a first means for measuring a first modified noise signal at a first end of a transmission line;
  a second means for measuring a second modified noise signal at a second end of a transmission line;
  a processing means adapted for processing the synchronised first and the second modified noise signals in order to derive the location of the ingress of the noise signal in the transmission line from said modified signals.

In a preferred embodiment the system further comprises a means for synchronising the first and the second means for measuring modified noise signals.

In a preferred embodiment the processing means is adapted for determining the arrival time difference of the first and second modified signals between the first and the second means for measuring the first and the second modified signals based on at least a predetermined line length and predetermined transmission line characteristics of the transmission line.

According to preferred embodiments processing means is adapted for determining a measure for the amplitude difference of the first and second modified signals based on at least predetermined line length and on a predetermined attenuation characteristics of the transmission line.

According to embodiments of the present invention the system further comprises a means for determining or retrieving the characteristics of the transmission line. These characteristics may comprise any of or any combination of line length, propagation velocity, attenuation characteristics, phase characteristics, or more in general a model of the complex valued transfer function H(f), as described above or other characteristics known to the skilled person.

Features and embodiments for the second aspect of the present invention, corresponding to features and embodiments for the first aspect of the present invention are similarly considered to be within the scope of the present invention, as will be recognized by the skilled person.

It should further be noted that a first measuring means and the processing means can be integrated in a first line testing unit (LTU1). A second line testing unit (LTU2) may comprise a second measurement means and may further comprise a means for transmitting its respective measurement towards the first line testing unit, (which may be adapted for receiving the measurement transmitted by the second line testing unit).

The line testing units can be integrated into existing network infrastructure elements or network nodes. They can for instance be integrated or incorporated or comprised in modems (e.g. XTU's).

The line testing units may also be provided such that they can be applied to an existing network infrastructure without necessarily being permanently integrated in the network (element). The line testing units or the system for determining the location of a defect in a wired transmission line can be applied to a line when a defect on the line has been discovered or must be identified. After the retrieval of the defect the line testing units or the system can be removed from the line or network.

In other embodiments only one of the two line testing units may be integrated in the (nodes of) the network infrastructure, while the other line testing unit can be independent or external from the permanent network infrastructure. The second line testing unit can be applied to the network at the moment that a specific line suffers from line defects, in order to retrieve the defects. Afterwards this line testing unit can be removed and used elsewhere.

Further aspects of the present invention are described by the dependent claims. The features from the dependent claims, features of any of the independent claims and any features of other dependent claims may be combined as considered appropriate to the person of ordinary skill, and not only in the particular combinations as defined by the claims.

BRIEF DESCRIPTION OF THE DRAWINGS

The accompanying drawings are used to illustrate embodiments of the present invention.

FIG. 1 illustrates embodiments of the present invention.

DESCRIPTION OF ILLUSTRATIVE EMBODIMENTS

The above and other advantageous features and objects of the invention will become more apparent and the invention will be better understood from the following detailed description when read in conjunction with the respective drawings.

The description of aspects of the present invention is performed by means of particular embodiments and with reference to certain drawings but the invention is not limited thereto. Depicted figures are only schematic and should not be considered as limiting.

In the description of certain embodiments according to the present invention, various features are sometimes grouped together in a single embodiment, figure, or description thereof for the purpose of aiding in the understanding of one or more of the various inventive aspects. This is not to be interpreted as if all features of the group are necessarily present to solve a particular problem. Inventive aspects may lie in less than all features of such a group of features present in the description of a particular embodiment.

While some embodiments described herein include some but not other features included in other embodiments, combinations of features of different embodiments are meant to be within the scope of the invention, and form different embodiments, as would be understood by the skilled person.

According to embodiments of the present invention, both modems of a DSL system, xTU-C and xTU-R (respectively XDSL Transceiver Unit—Central side and XDSL Transceiver Unit—Remote side) are listening synchronously to the transmission line, without sending predetermined excitation signals.

When an external common mode noise, the origin of which can be unknown, is injected and converted into differential mode at a particular point on the twisted pair, the differential mode noise will propagate to both ends of the twisted pair, where the modems are connected. The two modems however will detect this external noise with a certain differential time delay and/or with a certain differential attenuation.

Both of these parameters depend upon the length of the twisted pair between the injection point and each of the modems.

According to preferred embodiments of the present invention, the propagation speed and the attenuation characteristics of the twisted pair type are known, or can be determined by state of the art techniques. The propagation speed can, according to preferred embodiments, be considered to be constant over the total length of the line, or that the DSL operator can easily determine these parameters by using state of the art models and techniques.

By combining and correlating the measurements of both synchronised modems, the localisation of the noise injection can then be derived.

According to an aspect of the present invention, the Line test Units (LTUs) are synchronized in time. The synchronisation can comprise the processes of time transfer and of frequency synchronisation.

Time Transfer processes are methods for establishing that the clocks in both LTUs show an identical timestamp on at least one moment in time. In order to ensure identical timestamps on both ends for a prolonged period of time, also Frequency Synchronization is required. Frequency synchronization processes are methods for establishing that the clocks in both LTUs are running on the same frequency.

Therefore, if the timestamps are identical on both ends one moment in time, they remain identical on both ends for a prolonged period of time.

A range of state of the art methods exist for performing the time transfer process.

One type of methods for performing "Time transfer" is using the Global Positioning System (GPS) (see e.g. "GPS Time Transfer", WLODZIMIERZ LEWANDOWSKI AND CLAUDINE THOMAS, PROCEEDINGS OF THE IEEE, VOL. 79, NO. 7, JULY 1991). Another type of methods uses the Network Time Protocol (NTP), as defined by the IETF (IETF RFC 1305, "Network Time Protocol (Version 3)—Specification, Implementation and Analysis", March 1992, http://tools.ietf.org/html/rfc1305). This NTP is a protocol for distributing the Coordinated Universal Time (UTC) by means of synchronizing the clocks over IP (Internet Protocol) networks.

A skilled person may also devise new methods, only using the Physical network layer and by using the well-known principle of "Two-way time transfer". This would involve the use of sending a signal over the line from a first LTU (LTU1) to a second LTU (LTU2) as a marker of a certain physical moment in time ("time-marker"), communicating the LTU1 timestamp corresponding to the moment time-marker was transmitted from LTU1 to LTU2, and communicating the LTU2 timestamp corresponding to the moment time-marker was received from LTU2 to LTU1. The aspect of "Two-way time transfer" can further comprise the execution of a similar procedure in the other direction.

Various state of the art methods can be used to perform the frequency synchronisation.

One type of methods for performing Frequency Synchronization uses the Global Positioning System (GPS) (see e.g. "GPS Time Transfer", WLODZIMIERZ LEWANDOWSKI AND CLAUDINE THOMAS, PROCEEDINGS OF THE IEEE, VOL. 79, NO. 7, JULY 1991).

A skilled person may also devise new methods, only using the Physical network layer and by using the well-known principle of sending a signal from LTU1 to LTU2 on which LTU2 locks it's clock using PLL (Phase lock loop) techniques. This signal for example could be a single sinusoid (pilot-tone) or more sophisticated signals can be used.

Note that for frequency synchronization, a pilot tone (or some other signal in a limited portion of the band) can be sent between the units. However, the pilot tone signal should not be considered as an excitation signal, but merely as a synchronization signal. An "excitation signal" is intended to be used by the receiver for measuring the characteristics of the line. In the case with pilot tone, the LTU may listen to the pilot tone for synchronization. For measuring the noise signal, it can filter out the pilot tone. The presence of a pilot tone is though not necessary, as for instance synchronization can also be achieved by other means. Two basic examples illustrate embodiments of the present invention are described below (see FIG. 1). To further improve performance of these embodiments, more sophisticated state of the art signal processing in Step 3 and 4 can be used, as will be recognized by the skilled person.

EXAMPLE 1

Use of Time Measurements

0/ Noise injection occurs at a line defect (noise injection point (NIP)) at time t0, introducing a noise signal with amplitude A0, which propagates in both senses of the line (Noise Propagation direction (NP)).

a/ Both LTU1 and LTU2 measure and digitize the noise waveform.

b/ Via a communication channel setup between LTU1 and LTU2, the LTU2 sends the digitized noise waveform back to LTU1, together with timestamp information.

c/ LTU2 or external processing unit (LT-P) processes both waveforms to determine (t1−t2) [arrival times of the first and second modified noise signals at LTU1 and LTU2 respectively], e.g. via cross-correlation functions.

d/ LTU2 or external processing unit uses (t1−t2) to determine L1 (distance between the NIP (defect) and TLU1) and L2 (distance between NIP and TLU2), based on for instance Equation (1) and (2) derived below:

$$\text{Propagation time to LTU1} = (t1-t0) = L1/v$$

$$\text{Propagation time to LTU2} = (t2-t0) = L2/v$$

with v=propagation velocity (using knowledge about transmission medium)

Therefore $$(L1-L2) = v^*(t1-t2) \qquad \text{Equation (1)}$$

Based on knowledge about the total loop length L, which can be retrieved or measured by other means:

$$(L1+L2) = L \qquad \text{Equation (2)}$$

Out of which L1 and L2 can be resolved:

$$L1 = \tfrac{1}{2}^*(v^*(t1-t2)+L) \qquad \text{Equation (3)}$$

$$L2 = -\tfrac{1}{2}^*(v^*(t1-t2)-L) \qquad \text{Equation (4)}$$

EXAMPLE 2

Use of Amplitude Measurements a/ Both LTU1 and LTU2 measure and digitize the noise waveform.

b/ Via a communication channel setup between LTU1 and LTU2, the LTU2 sends the digitized noise waveform back to LTU1, optionally together with timestamp information.

c/ LTU2 or external processing unit (LT-P) processes both waveforms to determine A1/A2 (A1 and A2 being the amplitudes of the first and second modified noise signals respectively), e.g. by means of making use of cross-correlation functions, known to the skilled person.

d/ LTU2 or external processing unit uses (A1−A2) to determine L1 and L2, for instance as follows:

$$\text{Propagation Attenuation to LTU1} = 20^*\log 10(A1/A0) = k^*L1$$

$$\text{Propagation Attenuation to LTU2} = k^*L2$$

with k=attenuation (in dB) per unit length (using knowledge about transmission medium)

Therefore $$(L1-L2) = 1/k^*20^*\log 10(A1/A2) \qquad \text{Equation (1)}$$

Based on knowledge about the total length L of the loop, which can be retrieved or measured by other means:

$$(L1+L2) = L \qquad \text{Equation (2)}$$

Out of which L1 and L2 can be resolved:

$$L1 = \tfrac{1}{2}^*(1/k^*20^*\log 10(A1/A2)+L) \qquad \text{Equation (3)}$$

$$L2 = \tfrac{1}{2}^*(-1/k^*20^*\log 10(A1/A2)+L) \qquad \text{Equation (4)}$$

The examples which have been described may comprise also other steps.

It should be noted that, the examples described above based on amplitude and time difference are basic examples. In practice, more advanced methods can be applied in order to derive the location of the defect from the (representations of) the first and the second modified noise signals, as will be recognised by the skilled person.

In more advanced embodiments according to embodiments of the present invention, the method can comprise determining the cross correlation function of the first and second modified noise signal and the auto correlation function of the first or of the second modified noise signal, determining the Fourier transform for both functions and dividing these Fourier transforms.

While the principles of the invention have been set out above in connection with specific embodiments, it is to be clearly understood that this description is merely made by way of example and not as a limitation of the scope of protection which is determined by the appended claims.

The invention claimed is:

1. A method for locating a defect in a wired transmission line of a telecommunications network, said transmission line extending between a first end and a second end, and said defect allowing the ingress of an external noise signal into said transmission line, comprising:
   measuring a first modified noise signal at said first end by a first measuring unit, the first modified noise signal being a first modification of the external noise signal;
   determining a first representation of said first modified noise signal;
   measuring a second modified noise signal at said second end by a second measuring unit, the second modified noise signal being a second modification of the external noise signal;
   determining a second representation of said second modified noise signal; and
   deriving the location of said defect from said representations.

2. A method according to claim 1, further comprising:
   synchronizing said first and said second measuring unit located respectively at said first and said second end of said transmission line.

3. A method according to claim 2 wherein said synchronization of said first and said second measuring unit comprises time transfer and frequency synchronization between the first and second ends.

4. A method according to claim 2, wherein deriving the location of said defects from said first and said second representations comprises:
   determining the time difference between the arrival of the first modified noise signal and said second modified noise signal; and
   determining the location of said defects based on at least a line length and transmission line characteristics.

5. A method according to claim 1, comprising:
   determining a measure of the amplitude difference between the first and second representation of said first and said second modified noise signal at the first and second end; and
   derive the location of the defect from the measure of the amplitude difference, based on at least predetermined line length and on a predetermined characteristics of said transmission line.

6. A method according to claim 1, wherein said transmission line is a twisted pair transmission line.

7. A method according to claim 6, wherein said noise signal introduces a differential mode interference on the wires of the twisted pair line.

8. A method according to claim 1, wherein the ingress moment of the noise signal is not known.

9. A method according to claim 1, wherein said transmission line is not in use when measuring said first and said second modified noise signals.

10. A method according to claim 1, wherein said noise signal does not comprise a predetermined excitation signal.

11. A method according to claim 1, further comprising: determining or retrieving said line length.

12. A system for determining the location of a defect in a wired transmission line of a telecommunication network, said defect allowing ingress of an external noise signal into the transmission line, the system, comprising:
   a first measuring unit configured to measure a first modified noise signal at a first end of a transmission line, the first modified noise signal being a first modification of the external noise signal;
   a second measuring unit configured to measure a second modified noise signal at a second end of a transmission line, the second modified noise signal being a second modification of the external noise signal; and
   a processor configured to process and synchronize said first modified noise signal and said second modified noise signal in order to derive the location of ingress of the noise signal in the transmission line from said modified signals.

13. A system according to claim 12, further comprising:
   a synchronizing unit configured to synchronize said first and said second measuring units to measure modified noise signals.

14. A system according to claim 12, wherein said processor is configured to determine an arrival time difference of the first and second modified signals between said first and said second measuring units based on at least a line length and transmission line characteristics of said transmission line.

15. A system according to claim 12, wherein said processor is configured to determine a measure for the amplitude difference of the first and second modified signals based on at least line length and on a attenuation characteristics of said transmission line.

* * * * *